United States Patent [19]

Hawkins

[11] 3,726,210

[45] Apr. 10, 1973

[54] BALE BANDER

[75] Inventor: Peter A. Taylor Hawkins, Cholsey, near Wallingford, England

[73] Assignee: Pattersons Venture Limited, Wallingford, Berkshire, England; a part interest

[22] Filed: Feb. 16, 1971

[21] Appl. No.: 115,336

[30] Foreign Application Priority Data

Feb. 16, 1970 Great Britain...................7398/70
May 21, 1970 Great Britain.................24600/70

[52] U.S. Cl..........................100/7, 100/17, 214/6 B, 214/41
[51] Int. Cl. ............................................B65b 13/18
[58] Field of Search ......................100/7, 17; 214/41, 214/6 B

[56] References Cited

UNITED STATES PATENTS

| 3,289,859 | 12/1966 | Tarbox | 214/6 B |
| 3,430,783 | 3/1969 | Butler | 214/6 B |
| 3,563,162 | 2/1971 | Monroe | 100/7 |
| 3,610,441 | 10/1971 | Grey | 214/6 B |

*Primary Examiner*—Billy J. Wilhite
*Attorney*—Watson, Cole, Grindle & Watson

[57] ABSTRACT

A machine for stacking a number of bales of straw or other type commodity into a large package and banding the package while the bales are urged tightly together by the stacking means, which conveniently stacks by lifting and pushing horizontally with a pivoting movement against a restraint provided by the support on which stacking takes place.

13 Claims, 9 Drawing Figures

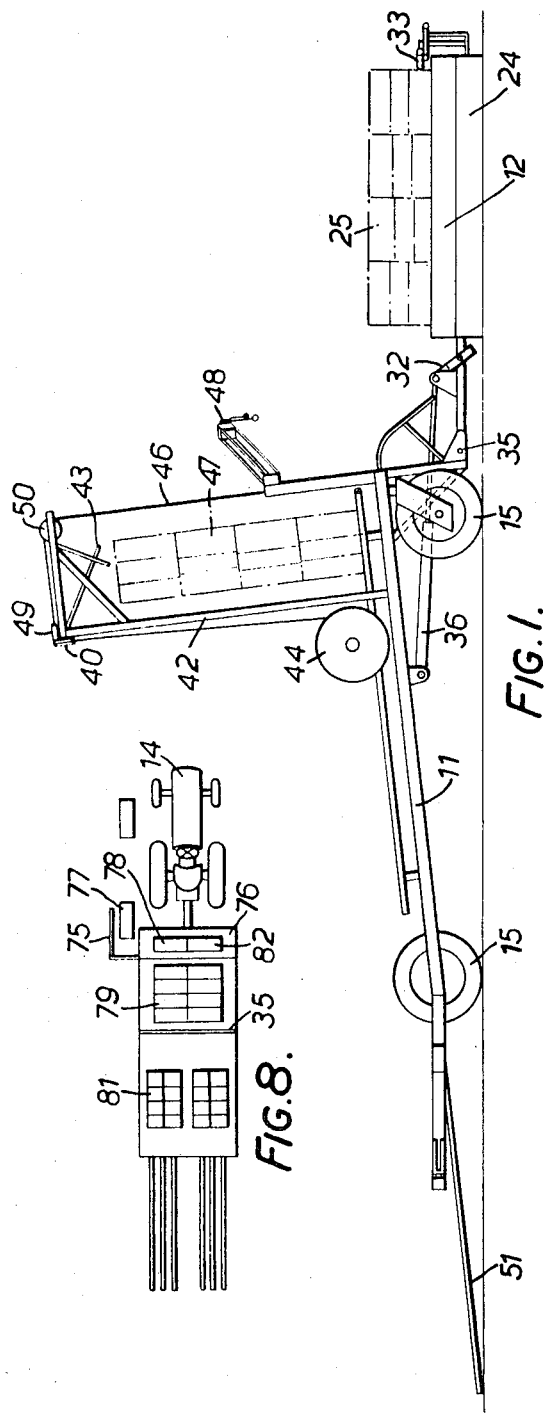
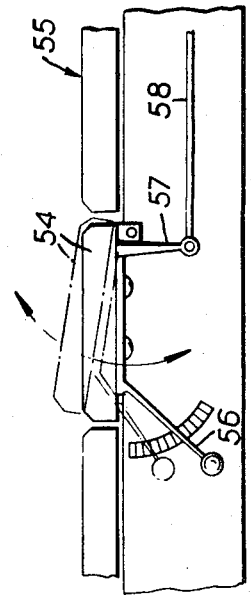
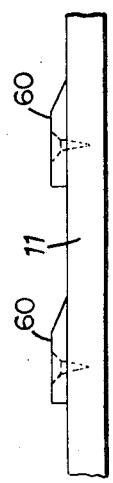

BALE BANDER

This invention relates to a bale bander and one object is to provide a machine which is capable of stacking standard bales of hay, straw, or other crops, into compact packages and banding the packages so that each can be lifted and moved by an appropriate lifter so as to reduce the work involved in handling the bales. Generally, bales of hay are left strewn over a field which has been harvested by a conventional baler so that the bale bander must be driven over the field to pick up, assemble, and band the bales into packages in the field.

According to the present invention a bander for a number of bales includes a loading platform on which bales can be loaded, a bale support, means for lifting the platform to deposit bales from the platform onto the support and then lowering the platform for loading with more bale, and banding means disposed to band a number of bales into a single package when a sufficient number has been assembled on the support by lifting the platform. The platform conveniently moves to deposit bales with a horizontal component of movement towards the support so that bales deposited can be packed tight on the support ready for banding. This may be assisted by means on the support tending to resist movement of bales along it.

The support itself is preferably arranged so that successive stacks of bales can push preceeding stacks backwards along the support so that, if desired, banding can be accomplished after a number of stacks have been assembled to give a multi-stack assembly and, eventually, the banded package can be pushed off the open rear of the support and left in the field as a new package is being built up on the front of the support.

The banding means may be disposed adjacent the support so that the band becomes partially wrapped around the package of bales as it is built up ready for easy joining of the ends of the band. The components of the bander will usually be adapted to be towed to the field by the tractor and thereafter driven by the tractor and operated by tractor power.

While the platform could be loaded with bales by hand before it is lifted to deposit the bales on the support, it is preferred that a mechanical loader be used. This is particularly suitable if a sufficient number of bales can be previously stacked side by side horizontally so that a number of bales can be loaded at the same time.

According to another aspect of the invention therefore, a platform loader is provided which comprises a loader having a ramp leading up to the platform, and a power operated pusher capable of movement towards and away from the ramp and an opening to the space between the pusher and the ramp whereby the loader can be moved so that such space encompasses bales to be loaded.

Another feature of the invention includes an automatic banding tensioner for any purpose according to which a mechanical (preferably hydraulic) jack is arranged to effect movement between band holding components so that the band tension is determined by the jack-operating pressure. The two ends of the band could be held by different components of the jacks, or one band end could pass over a guide on one component to extend parallel with the other end at the location where both are clamped so that the jack movement pulls both band ends.

The invention may be carried into practice in various ways and one embodiment and several modifications will be described by way of example, with reference to the accompanying drawings, of which:

FIG. 1 is an elevational view of a bander embodying the invention;

FIG. 5 is a detail view of the support;

FIG. 6 shows in detail a possible arrangement of friction boards on the support;

FIGS. 7 and 8 show in plan view alternative loading arrangements; and

Figure 2:
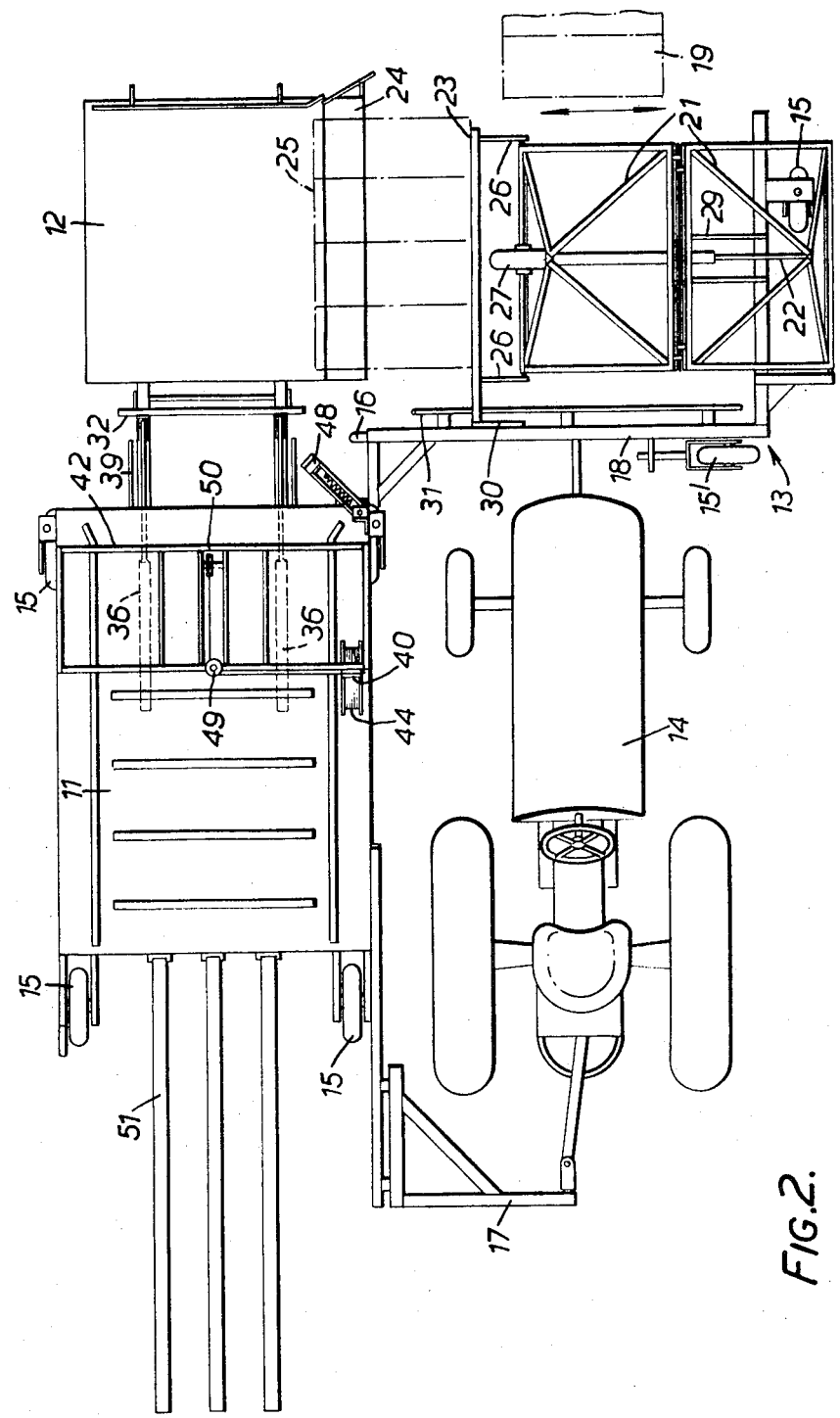
FIG. 2 is a plan view.

The bander consists essentially of three main components; a support 11, a loading platform 12 and a pusher loader 13, these components are designed to be towed to a field by a tractor 14 and for this purpose they are provided with suitable wheels 15. When ready for operation, the loader 13 is moved from a trailing position to the position shown in FIG. 2, which also shows a hitch point 16 used for towing. The tractor is then coupled to the components by means of a rear beam 17 and a front beam 18 and with the wheel 15' in FIG. 2 stowed, the tractor can be driven forwards, that is, from left to right in FIG. 2.

Figure 3:
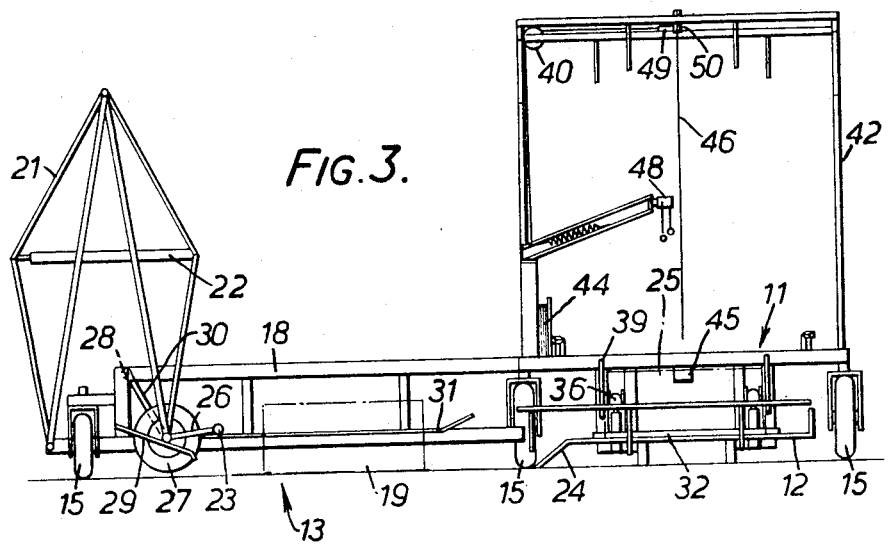
FIG. 3 is a front elevational view of the bander of FIG. 1.

It is assumed that conventional bales of hay, each measuring about 16 × 18 inches × 3 feet long (as one example) and each tied with a string as from a conventional baler, will be lying around the field so that the purpose of the bander is to assemble a number of such standard bales into a large banded package which can then be handled as a unit. Such a loader results in a great reduction in handling time. Conveniently, bales have been previously laid out in the field as indicated at 19 in FIG. 2 in sets of four bales lying on edge side by side horizontally so that, as the tractor 14 is driven forward the space between the loading platform 12 and the pusher 13 moves around the bales. It will be appreciated that in FIG. 2 the pusher, which consists of a pivoted expandable frame 21 capable of expansion by a hydraulic jack 22, is partially expanded, but that when it is contracted as shown in FIG. 3 there is ample room for the bales 19.

The jack 22 is then expanded so that a pusher bar 23 pushes the four bales 19 toward a ramp 24 at a side of platform 12 and thereafter up the ramp and on to the loading platform as indicated at 25.

The pusher bar 23 is mounted on the forward ends of arms 26 which are pivoted at their rear ends to the ends of an axle provided for a wheel 27. The wheel 27, which is normally held above the ground on a support 29, drops off the support, on to the ground as the jack 22 extends and then maintains the pusher bar 23 at approximately the same height above ground level and keeps the push at about a height approximately one third the height of bales 19. A link 30 is guided at its upper end on a roller 28 which runs in a track in the front beam 18. A bale guide 31 serves to locate the ends of the bales and to guide them correctly as they are pushed up the ramp 24.

Figure 4:
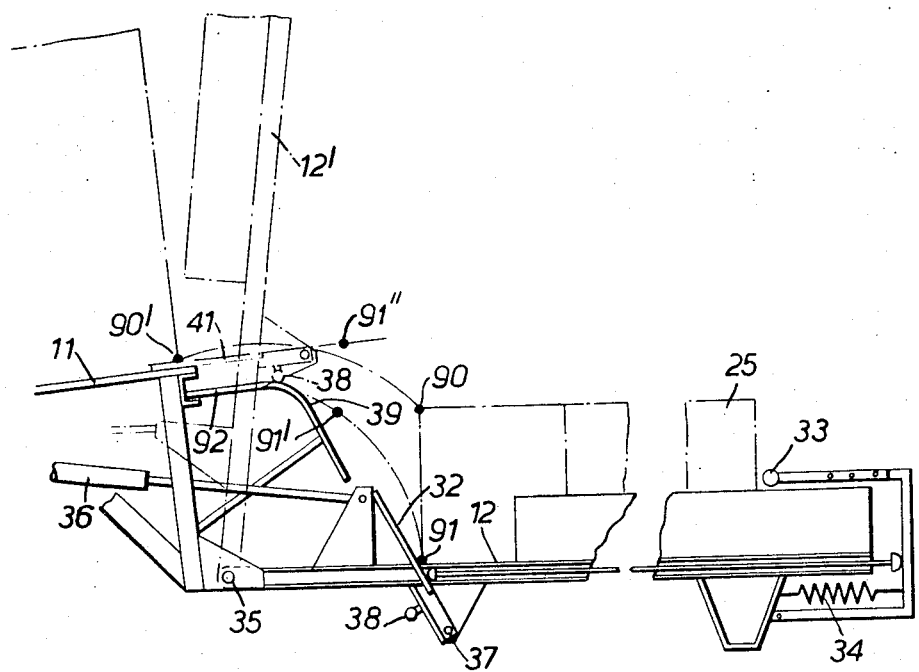
FIG. 4 is a detail at an enlarged scale of the connection between the platform and the support.

Once the bales are loaded on the platform 12, as at 25, they are urged against a lift plate 32, shown best in FIG. 4, by means of a guide rail 33 which is acted upon by a spring 34 to hold the bales against the lift plate.

Thereafter the platform 12 is lifted about a horizontal pivotal axis 35 by contraction of a pair of jacks 36, so that the platform with the bales is swung up to the front edge of the support 11, as indicated at 12' in FIG. 4.

The lift plate 32 can pivot on platform 12 about an axis 37. Thus the corner 90 of the bale unit in FIG. 4 moves in a circular arc to 90' about point 35, and, at that time, the corner 91 will be at 91'. Then the cam follower 38 rides up the cam 39 causing the lift plate 32 to pivot about 37 and lift the corner 91 to 91''. The final movement along the cam surface 92 is horizontal so as to effect a tight packing against the previously stacked bales. By expanding the jacks 36 the lift plate slides easily out from below the lowest bale. The bales will be stacked flat after lifting.

The support may require sides to locate the bales transversely, or prevent them falling off while on inclined ground.

The front end of the support 11 is provided with a gantry 42 forming an opening through which the stack of bales can enter the support, and at the top of the gantry is a cam rail 43 which acts against the spring 34 to lift the guide rail 33 from the top of the bales so that it can return without fouling the top of the stack just deposited.

A reel 44 of banding tape is carried on the gantry and the free end of the tape is first led upwardly to a pulley 40, inwards to a pulley 49 at the center of the gantry, forward to a pulley 50 and downwardly at the front of the support 11, to be held in a lock 45 shown in FIG. 3. The tape thus extends vertically as indicated at 46 and could form a back stop for the first pile of bales. As the stack is lifted into position, shown at 47 in FIG. 1, the tape 46 is pushed backwards thereby pulling off more tape from the reel and over the pulley 50. When the package is completely assembled more tape is pulled over the pulley 50 and is united with the end held at the lock 45 by a banding sealer unit 48 pivotally mounted on a part of the gantry. The sealer unit is finally swung back to a position in which it does not obscure the opening into the gantry 42, and the new end of tape is pulled forward to the lock 45.

Of course wire, string, plastic or metal banding could be used. The tape position should be transversely adjustable to accommodate the specific length of the bales being banded. There are many alternative dispositions of the reel, pulleys and sealer units; and, indeed, an automatic sealer may be used.

The bander is driven further over the field to another set of bales which are loaded in the same manner as aforedescribed and, when they are lifted up on to the platform, they push the previous stack backwards and take their place. Further stacks of bales can be lifted in the same manner and banded on the bander and eventually pushed off the rear end of the support 11 and down unloading skids 51. It will be appreciated that, if desired, two or three stacks of bales can be collected on the support before the band is sealed so that possibly three stacks each of four bales are banded into a single package of 12 bales. In this case, as each stack is pushed rearwardly by the next stack, it will carry with it the length of tape at 46 and draw off more tape from the reel 44. The length of the support 11 will be chosen in accordance with size package is found to be most desirable and will in general be arranged to carry one complete package until the next package has been completely built up. Banded packages thus can be pushed down skids 51 and left on the field in the wake of the bander.

In order to stop the bales from easily moving rearwardly over support 11, the support has is provided with horizontal friction boards 60 or steel angles (FIG. 5). Thus, as a stack is deposited with a horizontal movement of the platform, it is packed tightly against a preceding stack and, when the banding is effected, a tight package will be produced which could if necessary be lifted by the tape.

If desired, the support may have adjustable boards 54, as indicated in FIG. 6, which can be lifted from the general plane 55 of the support surface by a lever 56 whose movement is transferred to other boards 54 by means of bell cranks 57 and a rod 58. Movement could be hydraulically powered. Thus the friction can be increased if necessary, and particularly just before the package is completed so that it can be very tight prior to banding.

Figure 9:
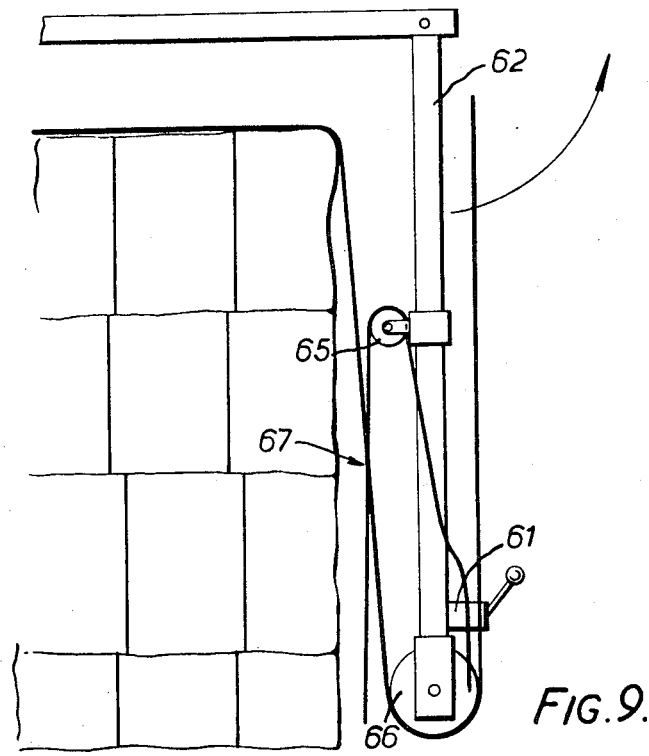
FIG. 9 shows an alternative band joining arrangement.

In an automatic band tensioning arrangement shown in FIG. 9, when the band is to be joined, a gantry extension is moved to bring a hydraulic jack 62 into position at the front of the stack. A free end of the band is released from the lock 45 and clamped in a double clamp 61 on the lower end of the jack after being passed over a roller 65 on the jack casing 62. The other end, which has passed around the stack 53, is led around a roller 66 at the end of the jack piston to be also clamped at 61. Then the jack is extended by a predetermined hydraulic pressure to provide a predetermined tension in the band before it is sealed at 67 by the unit 48.

It will be seen that, because of the roller 65 turning the tape through 180°, extension of the jack tightens both ends of the tape.

Figure 7:
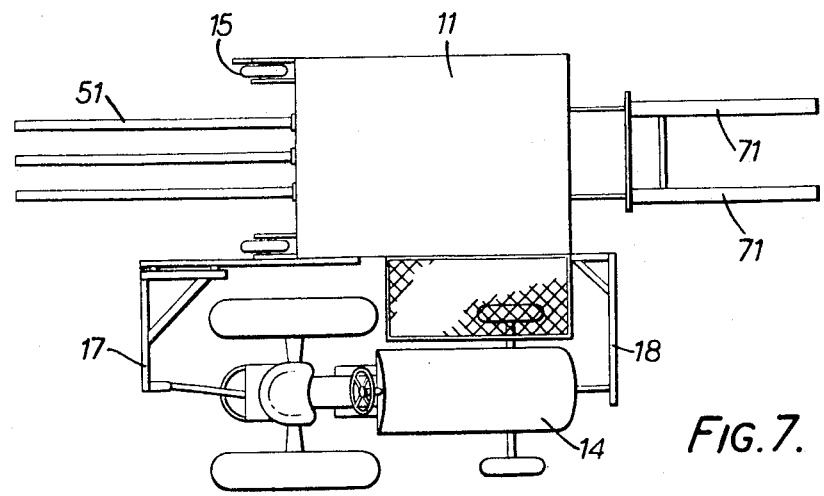

FIG. 7 shows a modification in which although the support gantry and banding arrangement are the same, the loading platform 12 is simpler in that it consists of two forwardly extending arms 71 on which a sufficient number of enough bales can be loaded by hand, after which the platform can be pivoted upwardly in the same manner as described with reference to platform 12. FIG. 7 also shows a platform enabling the driver to leave the tracter seat for quick access to the band sealing unit for effecting the band join after the package has been assembled.

It is also possible as shown in FIG. 8 to use an automatic lifting and positioning system which operates to lift bales and place them on the platform provided the machine is driven so that a guide 75 for a vertical elevator 76 is positioned about a bale 77 lying in the field. The driver then merely drives his tractor so that bale after bale is picked up and placed on the platform automatically after which the complete package is built up on the support and banded as described above.

The bales are turned throughout 90° as at 78 and loaded on the platform side by side as at 79. Thereafter the platform 12 is pivoted upwardly about its axis 35 to stack the bales on the support as before, as shown at 81.

The arrangement shown has two elevators, platforms and supports, side by side, and can be arranged to operate automatically so that when the first platform is loaded and starts to pivot, bales are fed to the second platform as shown at 82.

With automatic banding on completion of a package, the system operates continuously, with the driver only having to steer the tractor so that bales enter the guide 75 in turn.

The platform and bander could also be used in a factory to load a package of bales of fertilizer or wool or some other commodity onto pallets or lorries and banded ready for despatch in bulk, possibly lifting them by means of the band.

The length of skids 51 used in conjunction with that of the support should be such that a lifting operation of the platform serves to just slightly push one banded package to be in contact with the ground. Then, further forward movement towards fresh bales carries the banded package to be pulled off the skids by the friction with the ground, leaving the next package on the support as a stop against new bales.

What I claim as my invention and desire to secure by Letters Patent is:

1. A bander for a number of bales including a loading platform on which bales can be loaded, a bale support, means for lifting the platform to deposit bales from the platform onto the support and then lowering the platform for loading with more bales, and banding means disposed on the support adjacent the front end of the support to band a number of bales into a single package when a sufficient number has been assembled on the support by lifting the platform.

2. A bander as claimed in claim 1 in which the platform moves to deposit bales with a horizontal component of movement towards the support.

3. A bander as claimed in claim 2 in which the platform pivots about a horizontal transverse axis at the front of the support.

4. A bander as claimed in claim 2 including means on the support tending to resist movement of bales on the support from being pushed along it by the deposition of further bales, for enabling the bales to become tightly stacked side-by-side.

5. A bander as claimed in claim 2 in which the support is open at the back for enabling a banded package to be pushed off the support as a new package is being built up on the support.

6. A bander as claimed in claim 2 in which the banding means is disposed so that the band can be positioned before the bales are deposited on the support to extend centrally across an area through which the bales will be deposited.

7. A bander as claimed in claim 6 including means for holding the band to act as a vertical stop for the bales as they are deposited from the platform.

8. A bander as claimed in claim 2 including on the support a gantry having an opening through which bales can enter as they are deposited from the platform.

9. A bander as claimed in claim 1 including on the platform a lift plate which acts to support the weight of bales on the platform as the platform is lifted, and cam means for moving the lift plate to adjust the bales automatically as the platform is lifted to reduce interference with bales on the support.

10. A bander as claimed in claim 9 including a spring-loaded guide arranged to urge bales on the platform against the lift plate, and cam means for releasing the spring-loaded guide automatically as the platform reaches its lifted position.

11. A bander as claimed in claim 1 including a pusher capable of pushing bales from the ground on to the platform, the pusher being arranged to push by a movement which is transverse to a fore and aft axis of the bander.

12. A bander as claimed in claim 11 having an opening at the front enabling the bander to approach bales deposited on the ground until they are in a position to be pushed by the pusher on to the platform.

13. A bander as claimed in claim 1 mounted on wheels and adapted for connection to a tractor so that it can be driven over the ground by the tractor and the platform can be lifted by power derived from the tractor.

* * * * *